(12) United States Patent
Maynard et al.

(10) Patent No.: US 11,754,349 B2
(45) Date of Patent: Sep. 12, 2023

(54) HEAT EXCHANGER

(71) Applicant: Hamilton Sundstrand Corporation, Charlotte, NC (US)

(72) Inventors: Michael Maynard, Springfield, MA (US); Ahmet T. Becene, West Simsbury, CT (US); Michele Hu, Manchester, CT (US); Feng Feng, South Windsor, CT (US); Michael Doe, Southwick, MA (US); Gabriel Ruiz, Granby, CT (US); Ephraim Joseph, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 165 days.

(21) Appl. No.: 16/711,100

(22) Filed: Dec. 11, 2019

(65) Prior Publication Data

US 2020/0284531 A1    Sep. 10, 2020

Related U.S. Application Data

(60) Provisional application No. 62/815,835, filed on Mar. 8, 2019.

(51) Int. Cl.
*F28F 9/02*   (2006.01)
*F28D 7/16*   (2006.01)
(Continued)

(52) U.S. Cl.
CPC .............. *F28F 9/0275* (2013.01); *F28D 7/16* (2013.01); *F28D 7/1669* (2013.01); *F28D 9/0018* (2013.01); *B23P 15/26* (2013.01)

(58) Field of Classification Search
CPC ...... F28F 9/0275; F28F 9/0135; F28F 9/0133; F28F 9/0131; F28F 9/0132; F28F 9/013; F28F 2009/224; F28F 9/0239; F28F 9/0236; F28F 9/0241; F28F 9/22; F28F 9/0136; F28F 9/0138; F28F 2265/06; F28D 7/10;
(Continued)

(56) References Cited

U.S. PATENT DOCUMENTS 3,212,570 A   10/1965  Holman
3,482,626 A * 12/1969  Weisberg .............. F28D 7/1669
                                                          165/155

(Continued)

FOREIGN PATENT DOCUMENTS

CH            591062 A5 *  8/1977  .............. F28D 7/163
GB           1572315 A  *  7/1980  ............... F28D 7/10
WO     WO2017008108 A1    1/2017

OTHER PUBLICATIONS

Extended European Search Report for EP Application No. 19215929.1, dated Feb. 12, 2020, 6 pages.

*Primary Examiner* — Jianying C Atkisson
*Assistant Examiner* — For K Ling
(74) *Attorney, Agent, or Firm* — Kinney & Lange, P.A.

(57) ABSTRACT

A heat exchanger includes a first flow circuit structure having at least a first portion defined by a plurality of conduits and a second flow circuit structure having at least a second portion disposed at the first portion such that walls of the second portion are disposed between the conduits and are free to move relative to the conduits. Fluid flowing through the first flow circuit structure is fluidically isolated from fluid flowing through the second flow circuit structure.

15 Claims, 3 Drawing Sheets

(51) Int. Cl.
*F28D 9/00* (2006.01)
*B23P 15/26* (2006.01)

(58) Field of Classification Search
CPC ........ F28D 7/106; F28D 7/163; F28D 7/1669; F28D 9/0018
USPC .................................................. 165/158–160
See application file for complete search history.

(56) References Cited

U.S. PATENT DOCUMENTS

| | | | |
|---|---|---|---|
| 4,058,161 A * | 11/1977 | Trepaud | F28D 7/1669 165/158 |
| 4,147,208 A * | 4/1979 | Naegelin | F28D 7/163 376/394 |
| 4,148,281 A * | 4/1979 | Stoll | F22B 1/026 165/162 |
| 4,305,458 A * | 12/1981 | Jogand | F28D 7/1669 165/162 |
| 4,570,703 A | 2/1986 | Ringsmuth et al. | |
| 4,594,227 A * | 6/1986 | Ohsaki | B01J 8/0285 422/216 |
| 5,168,920 A * | 12/1992 | Brauer | F28D 7/163 99/278 |
| 5,355,945 A * | 10/1994 | Sanz | F28F 9/22 165/910 |
| 5,871,045 A * | 2/1999 | Hirth | F28D 7/08 165/157 |
| 7,240,723 B2 | 7/2007 | Wu et al. | |
| 7,438,122 B2 * | 10/2008 | Hawranek | F28D 1/0233 165/157 |
| 7,997,329 B2 * | 8/2011 | Mulder | B01J 19/2415 165/161 |
| 8,241,239 B2 * | 8/2012 | Solomon | A61M 1/34 604/5.01 |
| 9,134,072 B2 | 9/2015 | Roisin et al. | |
| 9,964,077 B2 | 5/2018 | Neal et al. | |
| 9,976,815 B1 | 5/2018 | Roper et al. | |
| 2010/0254891 A1 * | 10/2010 | Giroudiere | B01J 8/067 423/648.1 |
| 2015/0140190 A1 | 5/2015 | Cully et al. | |
| 2017/0008108 A1 | 7/2017 | Ranjan et al. | |
| 2017/0191762 A1 | 7/2017 | Duelser et al. | |
| 2017/0205149 A1 | 7/2017 | Derring et al. | |
| 2017/0248372 A1 | 8/2017 | Erno et al. | |
| 2018/0038654 A1 | 2/2018 | Popp et al. | |
| 2018/0051934 A1 | 2/2018 | Wentland et al. | |
| 2018/0100703 A1 | 4/2018 | Beaver et al. | |
| 2018/0100704 A1 | 4/2018 | Ewandowski et al. | |
| 2018/0283794 A1 | 10/2018 | Cerny et al. | |
| 2018/0283795 A1 | 10/2018 | Cerny et al. | |

* cited by examiner

HEAT EXCHANGER

CROSS-REFERENCE TO RELATED APPLICATION(S)

This application claims the benefit of U.S. Provisional Application No. 62/815,835 filed Mar. 8, 2019 for "Heat Exchanger" by M. Maynard, A. Becene, M. Hu, F. Feng, M. Doe, G. Ruiz, and E. Joseph.

BACKGROUND

The present disclosure is related generally to heat exchangers and more particularly to heat exchanger core designs.

Heat exchangers can provide a compact, low-weight, and highly effective means of exchanging heat from a hot fluid to a cold fluid. Heat exchangers that operate at elevated temperatures, such as those used in modern aircraft engines, often have short service lifetimes due to thermal stresses, which can cause expansion and cracking of the fluid conduits. Thermal stresses can be caused by mismatched temperature distribution, component stiffness, geometry discontinuity, and material properties (e.g., thermal expansion coefficients and modulus), with regions of highest thermal stress generally located at the interface of the heat exchanger inlet/outlet and core.

A need exists for heat exchangers with improved performance under thermal stress.

SUMMARY

A heat exchanger includes a first flow circuit structure having at least a first portion defined by a plurality of conduits and a second flow circuit structure having at least a second portion disposed at the first portion such that walls of the second portion are disposed between the conduits and are free to move relative to the conduits. Fluid flowing through the first flow circuit structure is fluidically isolated from fluid flowing through the second flow circuit structure.

A method of making a heat exchanging arrangement includes forming a plurality of conduits defining at least a first portion of a first flow circuit structure, and forming a plurality of walls positioned between the conduits defining at least a second portion of a second flow circuit structure such that the second portion is free to move relative to the first portion.

The present summary is provided only by way of example, and not limitation. Other aspects of the present disclosure will be appreciated in view of the entirety of the present disclosure, including the entire text, claims and accompanying figures.

Figure 1:
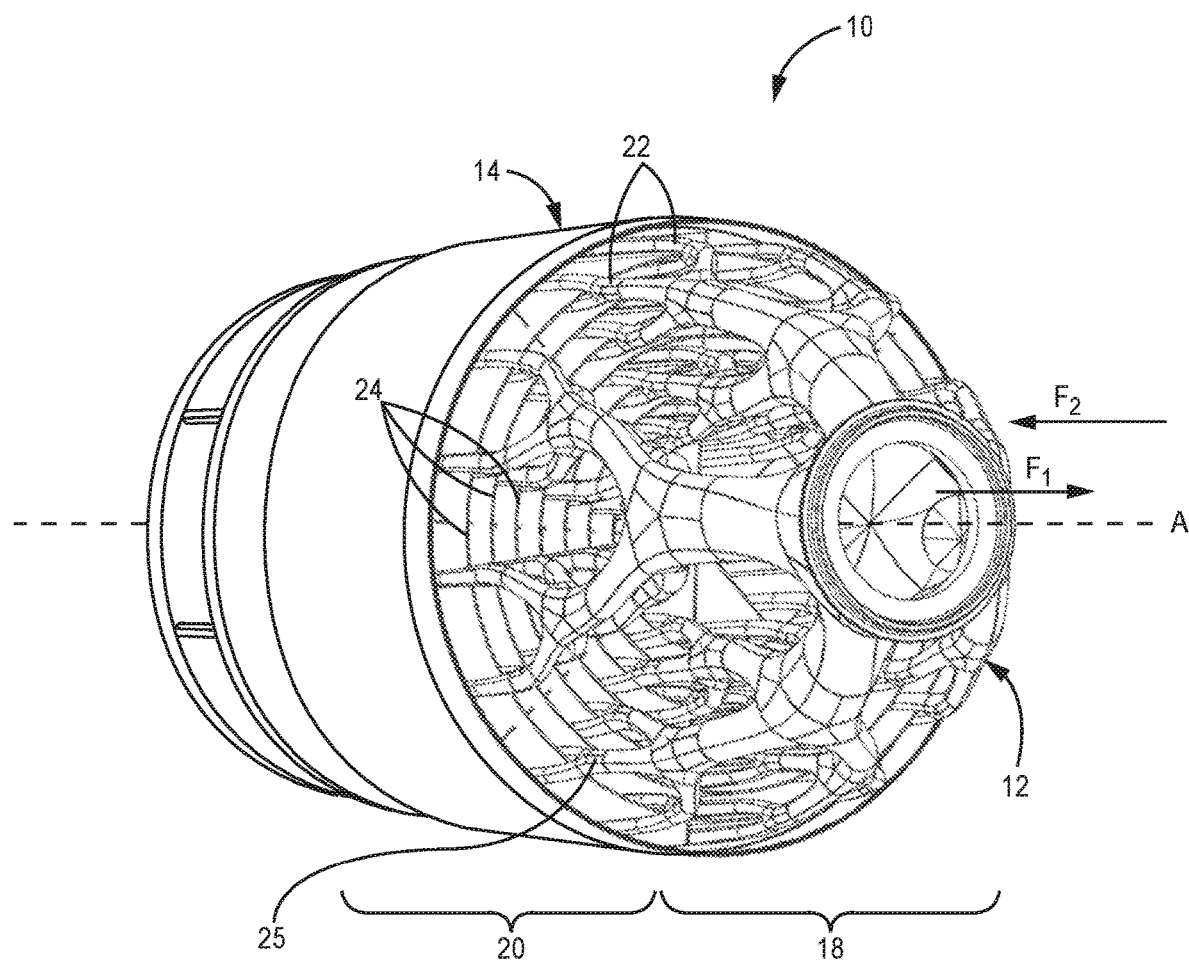
FIG. 1 is a perspective view of a heat exchanger according to an embodiment of the present disclosure.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Hot and cold passages are tied together in traditional heat exchanger designs. The present disclosure is directed to a heat exchanger in which hot and cold fluid passages are disconnected along the length of a heat exchanger core to provide improved performance under thermal stress. Cold passage walls or separating structures are arranged between hot flow conduits in a manner that allows cold passage structures to expand and contract independent of the hot flow conduits thereby reducing thermal stress within the heat exchanger. The heat exchanger of the present disclosure can be additively manufactured to achieve varied tubular dimensions (e.g., inner diameter, wall thicknesses, curvature, etc.) and to allow simultaneous and integral manufacture of hot and cold structures.

FIG. 1 shows a perspective view of heat exchanger 10, hot flow circuit 12, configured to direct a hot fluid $F_1$, and a portion of cold flow structure 14, disposed within and around hot flow circuit 12 to separate and direct flow of cooling fluid $F_2$. Hot flow circuit 12 includes inlet header 16 (shown in FIG. 3), outlet header 18, and core 20 disposed there between. During operation of heat exchanger 10, hot fluid $F_1$ is provided to inlet header 16, flows through core 20, and exits through outlet header 18. Thermal energy is transferred from hot fluid $F_1$ to cooling fluid $F_2$ as hot fluid $F_1$ passes through core 20. In one embodiment, illustrated in FIG. 1, core 20 can have a circular arrangement with a plurality of conduits 22 disposed in concentric rows around axis A, with axis A running through a center of inlet header 16 and outlet header 18. Other core designs are contemplated, including but not limited to elliptical and rectangular designs. It will be understood by one of ordinary skill in the art that the disclosed independent cold flow structure can be tailored for use with a wide variety of core geometries and is not limited to the embodiments shown. The core geometry illustrated in FIG. 1 is disclosed in the co-pending application, "CIRCULAR CORE FOR HEAT EXCHANGERS," which is incorporated herein in full by reference.

As illustrated in FIG. 1, heat exchanger 10 can be arranged as a counter-flow heat exchanger with cooling fluid $F_2$ flowing substantially parallel to and in the opposite direction of hot fluid $F_1$. Cooling flow structure 14 has a plurality of walls 24, which can be arranged in concentric cylinders to radially separate concentric sections of hot flow conduits 22. Walls 24 can extend a full longitudinal length of core 20 or partial length depending on the hot flow circuit geometry (e.g., limited by branching in the geometry disclosed in FIG. 1). In some embodiments, hot flow conduits 22 can extend from a branched inlet (not shown) to a branched outlet 25. Walls 24 can extend between the branched inlet and the branched outlet 25, as the point of branching would otherwise interrupt continuity of walls 24. Cooling flow structure 14 can include a funnel-shaped inlet (not shown) to direct cooling fluid $F_2$ through cooling fluid passages formed between walls 24. The funnel-shaped inlet can connect to the outermost wall 24 of cooling flow structure 14.

Figure 2:
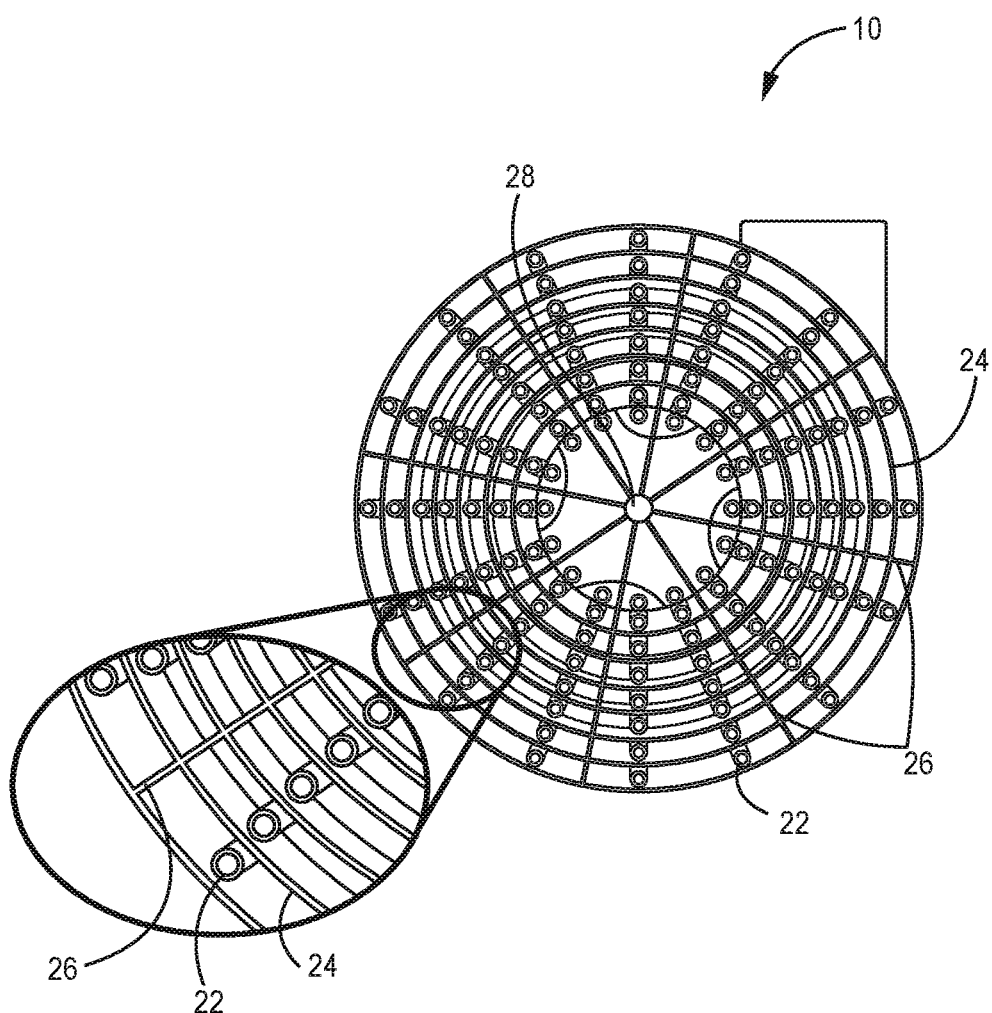
FIG. 2 is a cut away view of the heat exchanger of FIG. 1 taken perpendicular to a heat exchanger axis.

FIG. 2 shows a cut away view of heat exchanger 10 taken in an axial plane of heat exchanger 10. As illustrated, a singular cylinder-shaped cooling flow wall 24 can be disposed between each circular row of hot flow conduits 22 to improve heat transfer. It will be understood by one of ordinary skill in the art that the number of walls can be reduced (e.g., multiple rows of conduits 22 can be circumscribed by a single wall 24) for applications with lower heat transfer requirements. Walls 24 can be separate or unconnected from hot flow conduits 22 along the longitudinal length of hot flow conduits, such that walls 24 are free to move relative to hot flow conduits 22 during operation. The separation of walls 24 from conduits 22 allows for independent thermal expansion and contraction of each of the structures, which reduces thermal stress on core 20. In some embodiments, cooling flow structure 14 can be designed with respect to hot flow structure 12 to provide space between walls 24 and conduits 22, as illustrated in the expanded view of FIG. 2. In other embodiments, cooling flow structure 14 can be designed to allow walls 24 to come into contact with conduits 22, while remaining detached along the longitudinal length of conduits 22 to provide axial compliance to cold flow structure 14. During operation, walls 24 can slide on conduits 22 with thermal expansion and contraction.

In some embodiments, cylinder-shaped walls 24 can be tied together by one or more radially extending ribs 26. Ribs 26 can improve heat transfer by increasing surface area inside cooling flow channels and can provide stiffness to cooling flow structure 14. Increased stiffness can reduce vibrational response during operation but can also restrict thermal growth of cooling flow structure 14. As such, the number and positioning of ribs 26 can be tailored to meet heat transfer, compliance, and stiffness requirements. For example, larger heat exchangers may require additional stiffness (i.e., more ribs 26), while smaller heat exchangers may not require any ribs 26. Ribs 26 can extend radially from an innermost wall 24 to the outermost wall 24. Rib 26 can extend a full longitudinal length of hot flow conduits 22 or a partial length depending on the geometry of hot flow circuit 12. As described with respect to walls 24, ribs 26 can extend between points of branching (e.g., between a branched inlet and a branched outlet of conduits 22).

Figure 3:
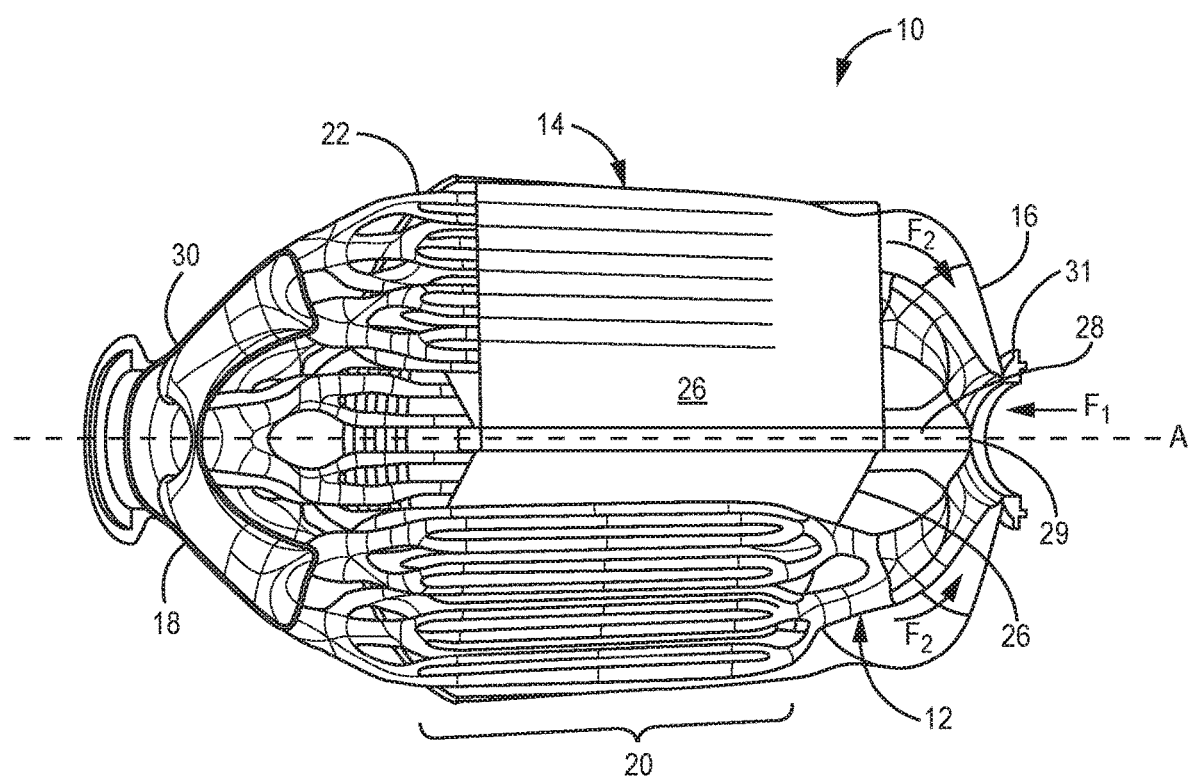
FIG. 3 is another cut away view of the heat exchanger of FIG. 1 taken along the axis of the heat exchanger.

In some embodiments, cooling flow structure 14 can include a central support structure 28, which can tie together ribs 26 along axis A. FIG. 3 shows a cut away view of heat exchanger 10 taken in a radial plane. As illustrated in FIG. 3, central support structure 28 can be tied to hot flow circuit 12 at a location point 29 on outlet header 18 to restrict axial, radial, and circumferential movement of cooling flow structure 14 during operation, while still retaining axial, radial, and transverse thermal compliance. Because walls 24 and ribs 26 remain unconnected from hot flow conduits 22, walls 24 and ribs 26 are able to expand and contract relative to hot flow circuit 12 under varying thermal loads independent of conduits 22. In alternative embodiments, cooling flow structure 14 can be tied to one or both inlet and outlet headers 16 and 18 by central support structure 28 at locations 29 and 30 or one or more walls 24 or ribs 26, for example, at location 31. It will be understood by one of ordinary skill in the art to maximize the distance between any two connection points to increase thermal compliance.

Although not illustrated, it will be understood by one of ordinary skill in the art that walls 24 can have any of a variety of geometries and connections to provide cooling flow channels around hot flow conduits of any of a variety of geometries. For example, a rectangular core can have a cooling flow structure arranged in a generally rectangular grid pattern. A support structure 28, if used, can be positioned in a center of the core and can be connected to one or more of the walls 24 and one or both of inlet and outlet headers 16 and 18. Alternatively, one or more walls 24, such as an outermost wall, can be connected to one or both of inlet and outlet headers 16 and 18.

The components of heat exchanger 10 can be formed partially or entirely by additive manufacturing. For metal components (e.g., Inconel, aluminum, titanium, etc.), additive manufacturing processes include but are not limited to powder bed fusion techniques such as direct metal laser sintering (DMLS), laser net shape manufacturing (LNSM), electron beam manufacturing (EBM). For polymer or plastic components, stereolithography (SLA) can be used. Additive manufacturing is particularly useful in obtaining unique geometries (e.g., varied core tube radii, arcuate core tubes, branched inlet and outlet headers) and for reducing the need for welds or other attachments (e.g., between inlet header 16 and conduits 22). However, other suitable manufacturing process can be used. For example, header and core elements can in some embodiments be fabricated separately and joined via later manufacturing steps. Hot flow circuit 12 and cooling flow structure 14 can be formed simultaneously as an integral component thereby eliminating the need for subsequent assembly and allowing for increased complexity in design.

The disclosed core arrangement offers improved thermal and mechanical properties. By incorporating a cooling flow passages into the heat exchanger that are not connected to hot flow passages, cooling flow structures are allowed to expand and contract independent of the hot flow conduits thereby reducing thermal stress within the heat exchanger.

Discussion of Possible Embodiments

The following are non-exclusive descriptions of possible embodiments of the present invention.

A heat exchanger according to an embodiment of the present disclosure, among other things, a first flow circuit structure having at least a first portion defined by a plurality of conduits and a second flow circuit structure having at least a second portion disposed at the first portion such that walls of the second portion are disposed between the conduits and are free to move relative to the conduits. Fluid flowing through the first flow circuit structure is fluidically isolated from fluid flowing through the second flow circuit structure.

The heat exchanger of the preceding paragraph can optionally include, additionally and/or alternatively, any one or more of the following features, configurations and/or additional components:

A further embodiment of the heat exchanger of preceding paragraph, wherein the conduits can be separated from the walls by a gap.

A further embodiment of the heat exchanger of any of the preceding paragraphs, wherein conduits can be arranged in a plurality of rows and the walls are arranged to separate the rows of conduits.

A further embodiment of the heat exchanger of any of the preceding paragraphs, wherein conduits can be arranged around an axis in a plurality of concentric rows, and wherein the plurality of walls comprise cylinders that circumscribe the rows.

A further embodiment of the heat exchanger of any of the preceding paragraphs, wherein the plurality of walls can further include one or more ribs, wherein the one or more ribs extend radially and connect the cylinders.

A further embodiment of the heat exchanger of any of the preceding paragraphs, wherein the conduits can extend from a branched inlet to a branched outlet and wherein the cylinders can extend between the branched inlet and the branched outlet.

A further embodiment of the heat exchanger of any of the preceding paragraphs, wherein the ribs can extend between the branched inlet and the branched outlet.

A further embodiment of the heat exchanger of any of the preceding paragraphs, wherein the second flow circuit structure can be unconnected from the first flow circuit structure such that the second flow circuit structure is in a floating relationship flow circuit structure.

A further embodiment of the heat exchanger of any of the preceding paragraphs, wherein the second flow circuit structure can be connected to the first flow circuit structure at an axially remote location.

A further embodiment of the heat exchanger of any of the preceding paragraphs, wherein the first portion comprises a heat exchanger core, the core disposed between and in fluid connection with an inlet header and outlet header, and wherein the second flow circuit structure is connected to the inlet header or the outlet header.

A further embodiment of the heat exchanger of any of the preceding paragraphs, wherein the second flow circuit structure is connected to the inlet header or the outlet header by a support member disposed at the center of the core and connected to at least one wall of the plurality of walls.

A further embodiment of the heat exchanger of any of the preceding paragraphs, wherein the second flow circuit structure can be connected to an inlet header or an outlet header of the heat exchanger.

A further embodiment of the heat exchanger of any of the preceding paragraphs, wherein the second flow circuit structure can be connected to the inlet header or the outlet header by a support member disposed at the center of the core and connected to at least one wall of the plurality of walls.

A further embodiment of the heat exchanger of any of the preceding paragraphs, wherein the second flow circuit structure can be connected to the inlet header or the outlet header by an outermost wall of the second flow circuit structure, the outermost wall being disposed around the plurality of conduits.

A method of making a heat exchanging arrangement includes, among other possible steps, forming a plurality of conduits defining at least a first portion of a first flow circuit structure, and forming a plurality of walls positioned between the conduits defining at least a second portion of a second flow circuit structure such that the second portion is free to move relative to the first portion.

The method of the preceding paragraph can optionally include, additionally and/or alternatively, any one or more of the following features, configurations, additional components, and/or steps:

The method of the preceding paragraphs can further include forming the conduits in a plurality of rows and forming the walls to separate the rows of conduits.

The method of any of the preceding paragraphs can further include forming the conduits around an axis in a plurality of concentric rows and forming the walls to circumscribe the rows.

The method of any of the preceding paragraphs can further include forming one or more ribs to extend radially and connect the walls.

The method of any of the preceding paragraphs can further include forming a support member at a center of the walls and connecting the support member to one or more ribs.

The method of any of the preceding paragraphs can further include connecting the support member to an inlet header or an outlet header of the heat exchanger.

The method of any of the preceding paragraphs can further include connecting the second flow circuit structure to the first flow circuit structure at an axially remote location.

While the invention has been described with reference to particular embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   a first flow circuit structure having at least a first portion defined by a plurality of conduits extending from a common branched inlet to a common branched outlet, each of the plurality of conduits comprising:
      an inlet section branching from the common branched inlet into a plurality of inlet section outlets;
      an outlet section branching from the common branched outlet into a plurality of outlet section inlets; and
      a plurality of mid-sections, each mid-section of the plurality of mid-sections fluidly connecting one of the plurality of inlet section outlets to one of the outlet section inlets, wherein mid-sections are arranged around an axis in a plurality of concentric rows; and
   a second flow circuit structure comprising a plurality of walls disposed between the conduits and unconnected from the conduits such that the plurality of walls is free to move relative to the conduits and wherein the walls of the plurality of walls are joined between the conduits to form a single structure; the plurality of walls comprising:
      cylinders that circumscribe each concentric row of the plurality of concentric rows of mid-sections such that radially adjacent mid-sections are separated by a cylinder; and
      one or more ribs, wherein the one or more ribs extend radially and connect the cylinders such that the one or more ribs separate adjacent mid-sections within each concentric row;
   wherein the cylinders extend between the common branched inlet and the common branched outlet;
   wherein fluid flowing through the first flow circuit structure is fluidically isolated from fluid flowing through the second flow circuit structure.

2. The heat exchanger of claim 1, wherein the conduits are separated from the walls by a gap.

3. The heat exchanger of claim 1, wherein conduits are arranged in a plurality of rows and the walls are arranged to separate the rows of conduits.

4. The heat exchanger of claim 1, wherein the second flow circuit structure further comprises a support member, wherein the support member is disposed at a center of the cylinders and supports the one or more ribs.

5. The heat exchanger of claim 1, wherein the ribs extend between the common branched inlet and the common branched outlet.

6. The heat exchanger of claim 1, wherein the second flow circuit structure is unconnected from the first flow circuit structure such that the second flow circuit structure is in a floating relationship with the first flow circuit structure.

7. The heat exchanger of claim 1, wherein the second flow circuit structure is connected to the first flow circuit structure at a location away from the first portion of the first flow circuit structure.

8. The heat exchanger of claim 7, wherein the first portion comprises a heat exchanger core, the core disposed between and in fluid connection with an inlet header and outlet header, and wherein the second flow circuit structure is connected to the inlet header or the outlet header.

9. The heat exchanger of claim 8, wherein the second flow circuit structure is connected to the inlet header or the outlet header by a support member disposed at the center of the core and connected to at least one wall of the plurality of walls.

10. The heat exchanger of claim 8, wherein the second flow circuit structure is connected to the inlet header or the outlet header by an outermost wall of the second flow circuit structure, the outermost wall being disposed around the plurality of conduits of the core.

11. The heat exchanger of claim 1, wherein the inlet section and the outlet section of each of the plurality of conduits are characterized by a first inner diameter, and wherein the plurality of mid-sections of each of the plurality of conduits is characterized by a second inner diameter, wherein the second inner diameter is less than the first inner diameter.

12. A method of making a heat exchanging arrangement comprising:
   forming a plurality of conduits defining at least a first portion of a first flow circuit structure, the plurality of conduits extending from a branched inlet to a branched outlet, each of the plurality of conduits comprising:
      an inlet section branching from the branched inlet into a plurality of inlet section outlets;
      an outlet section branching from the branched outlet into a plurality of outlet section inlets; and
      a plurality of mid-sections, each of the plurality of mid-sections fluidly connecting one of the plurality of inlet section outlets to one of the outlet section inlets, wherein mid-sections are arranged around an axis in a plurality of concentric rows; and
   forming a plurality of walls positioned between the conduits defining at least a second portion of a second flow circuit structure, wherein the plurality of walls is unconnected from the conduits such that the plurality of walls is free to move relative to the first portion and wherein walls of the plurality of walls are joined between the conduits to form a single structure the plurality of walls comprising:
      cylinders that circumscribe each concentric row of the plurality of concentric rows of mid-sections such that radially adjacent mid-sections are separated by a cylinder; and
      one or more ribs, wherein the one or more ribs extend radially and connect the cylinders such that the one or more ribs separate adjacent mid-sections within each concentric row;
      wherein the cylinders extend between the common branched inlet and the common branched outlet;
   wherein fluid flowing through the first flow circuit structure is fluidly isolated from fluid flowing through the second flow circuit structure.

13. The method of claim 12, and further comprising:
   forming a support member at a center of the walls; and
   connecting the support member to the one or more ribs.

14. The heat exchanger of claim 13, and further comprising connecting the support member to an inlet header or an outlet header of the heat exchanger.

15. The method of claim 12, and further comprising connecting the second flow circuit structure to the first flow circuit structure at a location away from the first portion of the first flow circuit structure.

* * * * *